(12) United States Patent
Zurecki et al.

(10) Patent No.: US 10,730,142 B2
(45) Date of Patent: Aug. 4, 2020

(54) GAS ATMOSPHERE CONTROL IN LASER PRINTING USING METALLIC POWDERS

(71) Applicant: AIR PRODUCTS AND CHEMICALS, INC., Allentown, PA (US)

(72) Inventors: Zbigniew Zurecki, Macungie, PA (US); Ranajit Ghosh, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 800 days.

(21) Appl. No.: 14/822,225

(22) Filed: Aug. 10, 2015

(65) Prior Publication Data

US 2016/0045981 A1 Feb. 18, 2016

Related U.S. Application Data

(60) Provisional application No. 62/036,292, filed on Aug. 12, 2014.

(51) Int. Cl.
*B23K 26/14* (2014.01)
*B33Y 30/00* (2015.01)
(Continued)

(52) U.S. Cl.
CPC ........ *B23K 26/1437* (2015.10); *B22F 3/1055* (2013.01); *B23K 26/123* (2013.01); *B23K 26/127* (2013.01); *B23K 26/342* (2015.10); *B33Y 10/00* (2014.12); *B33Y 30/00* (2014.12); *B22F 2003/1056* (2013.01); *B23K 2103/04* (2018.08); *B23K 2103/05* (2018.08); *B23K 2103/08* (2018.08); *B23K 2103/10* (2018.08);
(Continued)

(58) Field of Classification Search
None
See application file for complete search history.

(56) References Cited

U.S. PATENT DOCUMENTS

| 10,232,439 B2 * | 3/2019 | Gold | B22F 3/1055 |
| 2002/0015654 A1 * | 2/2002 | Das | B22F 3/1055 |
| | | | 419/8 |

(Continued)

FOREIGN PATENT DOCUMENTS

| CN | 201446232 | 5/2010 |
| CN | 103341625 | 10/2013 |

(Continued)

OTHER PUBLICATIONS

Derwent abstract of CN-103341625-A, Nov. 2015.*
(Continued)

*Primary Examiner* — Geoffrey S Evans
(74) *Attorney, Agent, or Firm* — Amy Carr-Trexler

(57) ABSTRACT

Methods and systems for controlling gas atmospheres in three-dimensional laser printing and weld overlay consolidation operations using metallic powders are provided. In one or more embodiments, such systems and methods comprise a printing chamber or laser weld overlay system, a gas supply system, a feed powder system, and one or more sensors employed to control the printing or welding operation. The methods and systems of the invention employ one or more inert gases having a purity greater than or equal to 99.995%

11 Claims, 2 Drawing Sheets

(51) Int. Cl.
    *B22F 3/105*     (2006.01)
    *B23K 26/12*     (2014.01)
    *B33Y 10/00*     (2015.01)
    *B23K 26/342*     (2014.01)
    *B23K 103/04*     (2006.01)
    *B23K 103/08*     (2006.01)
    *B23K 103/10*     (2006.01)
    *B23K 103/12*     (2006.01)
    *B23K 103/14*     (2006.01)
    *B23K 103/18*     (2006.01)

(52) U.S. Cl.
    CPC ...... *B23K 2103/12* (2018.08); *B23K 2103/14* (2018.08); *B23K 2103/15* (2018.08); *B23K 2103/26* (2018.08); *Y02P 10/295* (2015.11)

(56) References Cited

U.S. PATENT DOCUMENTS

| | | | | |
|---|---|---|---|---|
| 2002/0029980 | A1* | 3/2002 | Muroguchi | G01N 27/4175 205/784.5 |
| 2005/0023256 | A1* | 2/2005 | Sankaranarayanan | B23K 26/0823 219/121.63 |
| 2011/0248001 | A1* | 10/2011 | Kawanaka | C30B 11/00 219/76.1 |
| 2011/0259862 | A1 | 10/2011 | Scott et al. | |
| 2011/0291331 | A1 | 12/2011 | Scott | |
| 2014/0163717 | A1* | 6/2014 | Das | B22F 3/1055 700/119 |
| 2014/0301883 | A1* | 10/2014 | Wiesner | B22F 3/1055 419/1 |
| 2016/0067779 | A1* | 3/2016 | Dautova | B23K 15/06 419/7 |

FOREIGN PATENT DOCUMENTS

| CN | 103341625 A | * 10/2013 |
|---|---|---|
| EP | 2730353 | 5/2014 |

OTHER PUBLICATIONS

Machine translation of China Patent No. 103341625-A, Dec. 2017.*
Anonymous: "PureLab GP-2-120 HE Inert Gas Purifier", Nov. 1, 2013 (Nov. 1, 2013), XP055554178, Retrieved from the Internet: URL:https://web.archive.org/web/20131101013455/http://www.gloveboxes.com:80/gas/gp-2-120.php [retrieved on Feb. 8, 2019].

* cited by examiner

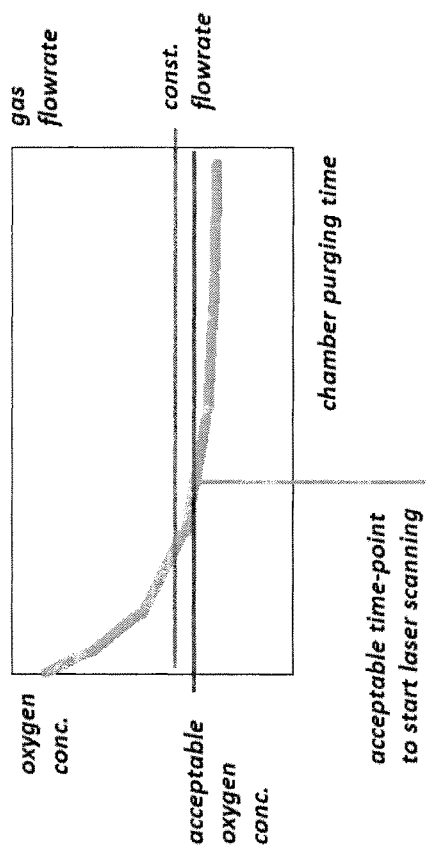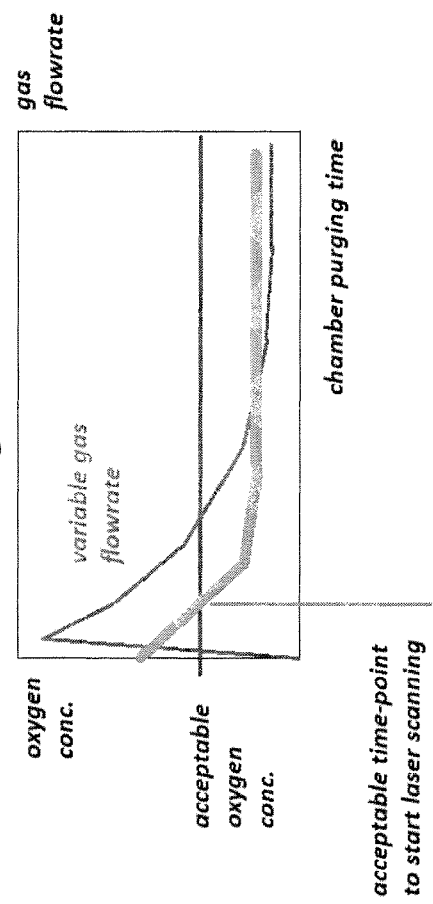

GAS ATMOSPHERE CONTROL IN LASER PRINTING USING METALLIC POWDERS

CROSS-REFERENCE TO RELATED APPLICATIONS

This application claims the benefit of U.S. Application No. 62/036,292, filed on Aug. 12, 2014. The disclosure of Application No. 62/036,292 is hereby incorporated by reference.

BACKGROUND OF THE INVENTION

The present invention relates to laser 3-dimensional printing (3DP) of metallic parts using a powder bed filled chamber, a well known "Additive Manufacturing" (AM) method, as well as laser 3DP using metallic powder spray, another popular AM method. The methods and apparatuses of the invention can also be applied in the areas of laser weld overlays and/or additive deposits produced with metallic powders.

The enumerated manufacturing technologies frequently utilize oxidation and/or $H_2O$—$H_2$-hydrocarbon gas sensitive metal powders, which include all types of alloy steels and superalloys, Ti, Al, Ni, Cu, precious metals, Co, Zr, Nb, Mo, W, Ta, Hf, Mg, and B alloys, as well as oxidation and/or $H_2O$—$H_2$-THC sensitive powder compositions resulting in composite parts containing metals, carbides, nitrides, aluminides, silicides, and/or borides. Consequently, reduction or elimination of sources of $O_2$, $H_2O$, $CO_2$—CO, $H_2$ and total hydrocarbons (THC) from the printing and the surroundings of the metal solidification area is desirable for improvement of process economics and product quality.

3DP methods of the prior art utilize nominally inert argon or helium, but overlook the issues of impurity content in these processing gases and in the printing apparatus, and fail to properly address atmosphere control in the powder feeding and printing surroundings. This results in reduced 3DP yields, lower productivity, and poor product quality.

Feed powders used in 3DP frequently include oxide films and inclusions, gas porosity, and adsorbed water. In addition (and depending on the powder making method used), many alloys, e.g. ferrous alloys, may contain substantial quantities of hydrogen (H) or nitrogen (N) dissolved in the solid matrix. When these powders are re-melted during typical 3DP operations, little time is available for the release of the contaminants before the molten pool of metal is solidified. A clean printing environment, e.g. a sweep stream of an ultra-pure Ar or He, can facilitate the removal of these contaminants. If the contaminants are not removed during the laser remelting and solidification, the product may contain oxide and nitride inclusions trapping $H_2$ and $N_2$ bubbles, as well as a solid matrix that's unnecessarily hardened and embrittled by the presence of undesired solutes. Entrapped bubbles deteriorate the surface finish and mechanical properties of the product. Non-metallic inclusions typically form with the most reactive alloy components, e.g. with Cr in stainless steels, which results in the removal of those alloying elements from the solid matrix and the subsequent loss of corrosion resistance. The presence of non-metallic inclusions in the product may, also, alter mechanical properties of the product in an undesired direction or promote microcracking during cooling.

Because oxygen, nitrogen, and other non-metallic elements are effective surface active agents even at very low concentration levels (on the order of parts per million), their precise control can influence the shape of molten metal pools formed and the formation of evaporative metal spatter taking place under laser beam. The melt pool and spatter are critical considerations for printing with increasingly popular, very fine metal powders which, on one hand, rapidly adsorb all environmental contaminants but, on the other hand, absorb the laser beam energy better, thus offering higher production rates, improved surface finish, and geometric resolution. It is expected that a range of recycled feed powders used in 3DP can be made to resemble the surface characteristics of the fine powders mentioned by precisely controlling the printing conditions, i.e. precise atmosphere control can improve 3DP operations using high loads of recycled powders. A "99.999%+" inert gas purity may be required to effectively reduce contaminant effects.

Hot isostatic pressing (HIP) and other heat treatments are frequently employed as post-processing steps on 3DP parts to correct some of the problems described. The need for and extent of post-processing steps could be reduced, though, if the 3DP conditions are improved. It is therefore the objective of this invention to improve the 3DP process and products by controlling the gas atmosphere used in the 3DP process.

BRIEF SUMMARY OF THE INVENTION

The present invention is directed to methods and systems for controlling gas atmospheres in three-dimensional laser printing and weld overlay consolidation operations using metallic powders.

In one or more embodiments, the invention is directed to methods for controlling gas atmospheres in three-dimensional laser printing using metallic powders. Such methods comprise the steps of: (a) providing a 3D printer comprising a printing chamber, a gas supply system, and a feed powder system; (b) providing an inert gas having a purity greater than or equal to 99.995% from the gas supply system to the printing chamber; (c) providing one or more feed powders from the feed powder system to the printing chamber; (d) providing one or more gas sensors located in one or more of the printing chamber, gas supply system, or feed powder systems; and (e) printing an article, wherein the flowrate of the inert gas is dynamically adjusted in response to one or more outputs from the one or more gas sensors.

In further embodiments, the invention is directed to methods for controlling gas atmospheres in laser weld overlay operations using metallic powders. Such methods comprise the steps of: (a) providing a laser weld overlay system, a gas supply system, and a feed powder system; (b) providing an inert gas having a purity greater than or equal to 99.995% from the gas supply system to the weld overlay system; (c) providing one or more feed powders from the feed powder system to the weld overlay system; and (d) providing one or more gas sensors located in one or more of the weld overlay system, gas supply system, or feed powder systems; wherein the flowrate of the inert gas is dynamically adjusted in response to one or more outputs from the one or more gas sensors.

In the same or other embodiments, the invention is further directed to systems for controlling gas atmospheres in laser printing operations using metallic powders. Such systems comprise: (a) a 3D printer comprising a printing chamber, a gas supply system, and a feed powder system, (b) one or more gas cylinders comprising an inert gas having a purity greater than or equal to 99.995%, (c) one or more gas sensors located in one or more of the printing chamber, the gas supply system, or the feed powder system, and (d) one or more gas purifiers located within the one or more gas cylinders, within the gas supply system, or between the gas supply system and the printing chamber.

BRIEF DESCRIPTION OF THE DRAWINGS

FIG. 2A illustrates conventional 3DP process conditions.

FIG. 2B illustrates 3DP process conditions according to the present invention.

DETAILED DESCRIPTION OF THE INVENTION

Figure 1:
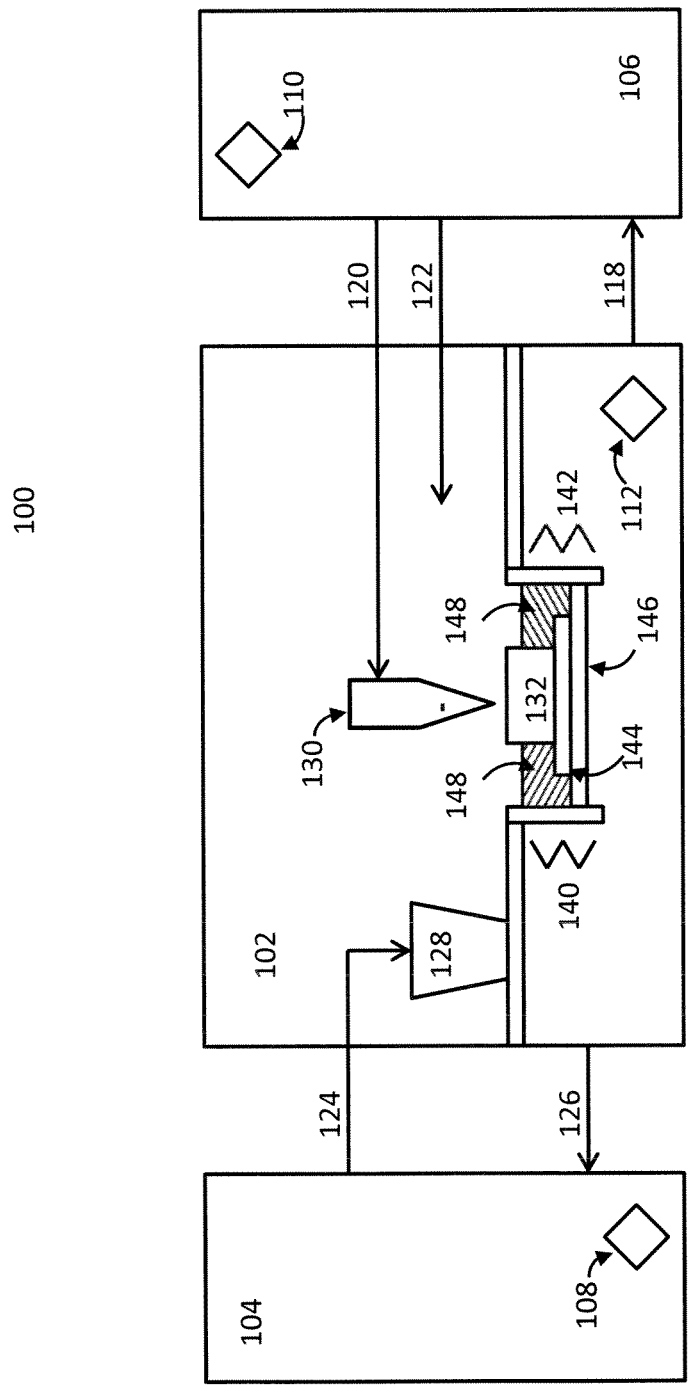
FIG. 1 illustrates a system according to the present invention, which incorporates a conventional three dimensional printing (3DP) chamber with a gas supply system, a feed powder system, and multiple sensors.

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Measurements, amounts and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described. Further, where multiple possible ranges are given for a single property, the minimum value from one range may be combined with the maximum value from another range. For example, concentration ranges of "from 3 to 10% or from 5 to 12%" should be interpreted to also include the ranges from 3 to 12% and from 5 to 10%. The foregoing interpretation guidelines should apply regardless of the breadth of the range or the characteristics being described.

Unless otherwise stated, any feature described herein can be combined with any aspect or any other feature described herein.

In some embodiments of the present invention, methods are provided for controlling gas atmospheres in three-dimensional laser printing using metallic powders. Such methods comprise the steps of: (a) providing a 3D printer comprising a printing chamber, a gas supply system, and a feed powder system; (b) providing an inert gas having a purity greater than or equal to 99.995% from the gas supply system to the printing chamber; (c) providing one or more feed powders from the feed powder system to the printing chamber; (d) providing one or more gas sensors located in one or more of the printing chamber, gas supply system, or feed powder systems; and (e) printing an article, wherein the flowrate of the inert gas is dynamically adjusted in response to one or more outputs from the one or more gas sensors.

In further embodiments, the one or more outputs from the one or more gas sensors may be selected from the oxygen concentration inside the printing chamber, the oxygen concentration inside the feed powder system, or both. In the same or other embodiments, the method may further comprise providing an in-line gas purifier within the gas supply system or between the gas supply system and the printing chamber. In the same or other embodiments, the inert gas purity may be greater than or equal to 99.998%, or greater than or equal to 99.999%. In the same or other embodiments, one or more of the gas sensors may be a zirconia gas sensor having a millivolt reading more negative than −185 mV at a zirconia cell operation temperature of 600° C. In the same or other embodiments, the one or more feed powders may be selected from alloy steels; superalloys; titanium, aluminum, nickel, copper, precious metals, cobalt, zirconium, niobium, molybdenum, tungsten, tantalum, hafnium, magnesium, and boron alloys; powder compositions resulting in composite parts containing metals, carbides, nitrides, aluminides, silicides, or borides; and combinations thereof. In the same or other embodiments, the inert gas may be selected from argon, helium and krypton, or combinations thereof. In the same or other embodiments, the printing chamber may comprise a powder bed, and the method may further comprise the step of pre-heating the powder bed to a temperature greater than about 400° C., or greater than 500° C., or greater than 600° C., prior to the printing step.

In other embodiments of the present invention, methods are provided for controlling gas atmospheres in laser weld overlay operations using metallic powders. Such methods comprise the steps of: (a) providing a laser weld overlay system, a gas supply system, and a feed powder system; (b) providing an inert gas having a purity greater than or equal to 99.995% from the gas supply system to the weld overlay system; (c) providing one or more feed powders from the feed powder system to the weld overlay system; and (d) providing one or more gas sensors located in one or more of the weld overlay system, gas supply system, or feed powder systems; wherein the flowrate of the inert gas is dynamically adjusted in response to one or more outputs from the one or more gas sensors.

In further embodiments, the one or more outputs from the one or more gas sensors may be selected from the oxygen concentration inside the laser weld overlay system, the oxygen concentration inside the feed powder system, or both. In the same or other embodiments, the method may further comprise providing an in-line gas purifier within the gas supply system or between the gas supply system and the laser weld overlay system. In the same or other embodiments, the inert gas purity may be greater than or equal to 99.998%, or greater than or equal to 99.999%. In the same or other embodiments, one or more of the gas sensors may be a zirconia gas sensor having a millivolt reading more negative than −185 mV at a zirconia cell operation temperature of 600° C. In the same or other embodiments, the one or more feed powders may be selected from alloy steels; superalloys; titanium, aluminum, nickel, copper, precious metals, cobalt, zirconium, niobium, molybdenum, tungsten, tantalum, hafnium, magnesium, and boron alloys; powder compositions resulting in composite parts containing metals, carbides, nitrides, aluminides, silicides, or borides; and combinations thereof. In the same or other embodiments, the inert gas may be selected from argon, helium and krypton, or combinations thereof. In the same or other embodiments, the laser weld overlay system may comprise a powder bed, and the method may further comprise the step of pre-heating the powder bed to a temperature greater than about 400° C., or greater than 500° C., or greater than 600° C., prior to the printing step.

In further embodiments of the present invention, systems are provided for controlling gas atmospheres in laser printing operations using metallic powders. Such systems comprise: (a) a 3D printer comprising a printing chamber, a gas supply system, and a feed powder system, (b) one or more gas cylinders comprising an inert gas having a purity greater than or equal to 99.995%, (c) one or more gas sensors located in one or more of the printing chamber, the gas supply system, or the feed powder system, and (d) one or more gas purifiers located within the one or more gas cylinders, within the gas supply system, or between the gas supply system and the printing chamber. In further embodiments, one or more of the one or more gas sensors may comprise a zirconia gas sensor, which may have a millivolt reading more negative than −185 mV at a zirconia cell operation temperature of 600° C. In the same or other embodiments, one or more of the one or more gas sensors may comprise a dew point meter or a trace oxygen sensor. In the same or other embodiments, the system may further comprise an in-line gas purifier within the gas supply system or between the gas supply system and the printing chamber. In the same or other embodiments, the inert gas purity may be greater than or equal to 99.998%, or greater than or equal to 99.999%. In the same or other embodiments, the feed powder system may comprise one or more feed powders, and the one or more feed powders may be selected from alloy steels; superalloys; titanium, aluminum, nickel, copper, precious metals, cobalt, zirconium, niobium, molybdenum, tungsten, tantalum, hafnium, magnesium, and boron alloys; powder compositions resulting in composite parts containing metals, carbides, nitrides, aluminides, silicides, or borides; and combinations thereof. In the same or other embodiments, the inert gas may be selected from argon, helium and krypton, or combinations thereof.

FIG. 1 illustrates a system 100 comprising a typical 3DP chamber 102 of the prior art that incorporates a feed powder system 104, a gas supply system 106, and sensors 108/110/112 according to the present invention. The 3DP chamber comprises a platform 146 and/or substrate 144 upon which a part 132 is formed by a laser printing head 130. Feed metal powder is supplied from the feed powder system 104 to a powder hopper 128 via powder feed line 124. The feed metal powder is then supplied from the hopper 128 to a powder bed 148. The powder bed 148 may optionally be outfitted with one or more powder bed heaters 140/142. Gas is supplied to the laser printing head 130 via gas feed line 120, and to the printing chamber 102 via gas feed line 122. Metal powder may be recycled to the feed powder system 104 via line 126, and gas may be recycled to the gas supply system via line 118.

The gas supply system 106 may contain pressurized cylinders (not shown) comprising high purity argon (Ar) or helium (He). "High purity" as used herein means 99.998% purity or greater, preferably 99.999% (sometimes referred to as "5N" purity) or greater. Examples of contaminant concentrations in commercially available argon having a variety of purity levels are listed in Table 1.

TABLE 1

Example of Ar purity grades available commercially (THC = total hydrocarbons):

| Argon, Research Purity 99.999% [6.0N] | |
|---|---|
| Carbon Dioxide | <0.1 ppm |
| Carbon Monoxide | <0.1 ppm |
| Nitrogen | <1 ppm |
| Oxygen | <0.5 ppm |
| THC | <0.1 ppm |
| Water | <1 ppm |
| Argon, 99.9995% [5.5N] | |
| Carbon Dioxide | <1 ppm |
| Carbon Monoxide | <1 ppm |
| Oxygen | <1 ppm |
| THC | <0.5 ppm |
| Water | <1 ppm |
| Argon, Ultra Purity 99.999% [5.0N] | |
| Carbon Dioxide | <1 ppm |
| Carbon Monoxide | <1 ppm |
| Oxygen | <3 ppm |
| THC | <0.5 ppm |
| Water | <5 ppm |
| Argon, Zero Gas 99.998% [4.8N] | |
| Oxygen | <4 ppm |
| THC | <0.5 ppm |
| Water | <5 ppm |

Alternatively, lower initial gas purity (i.e., less than 99.998% pure) may be used if an optional in-line purifier (not shown) is employed between the sourcing cylinders and the point of use. Such in-line purifiers may be located, for example, inside the printing chamber and laser head. Other in-cylinder purifiers may also be used in conjunction with a gas having lower initial purity. Gas sensor 110, located at the exit from the gas supply system 106 to the printing chamber 102 and laser 130, monitors the gas purity to ensure compliance with requirements. Sensor 112 monitors changes in the printing chamber 102 as a result of the printing process and the evolution of gases from the metal powder as well as from the walls of the chamber. Connected to electromechanical gas flow control components inside the gas supply system, sensor 112 may trigger an increase or decrease of the overall flowrate in order to maintain the contaminant level below the desired value. The gas used in the chamber and then returned to the gas supply system 106 may be vented or recompressed and purified in the optional in-line purifier. There, returned gas may additionally mixed with a fresh make-up gas. Feed metal powders are typically supplied to the printing chamber via line under pure inert gas to a powder hopper 128, but an alternative solution may employ a powder recycling and re-classifying system (powder feed system) 104 also operating under a high-purity inert gas to supply feed metal powders to the powder hopper 128 via feed line 124 as shown. Sensor 108 is placed inside the powder feed system 104 in order to control the atmosphere therein and remove adsorbed gases. Like sensor 112, sensor 108 may be connected to gas flow controls inside the gas supply system (not shown), to effect an increase or decrease of the overall flowrate in order to maintain the contaminant level below the desired value. Feed powders used herein may include alloy steels, including but not limited to stainless steel; superalloys; titanium, aluminum, nickel, copper, precious metals, cobalt, zirconium, niobium, molybdenum, tungsten, tantalum, hafnium, magnesium, and boron alloys; powder compositions resulting in composite parts containing metals, carbides, nitrides, aluminides, silicides, or borides; and combinations thereof.

Trace oxygen and moisture (dew point and frost point) analyzers may be used as sensors 108/110/112. Additionally, various types of gas analyzers can be used and/or combined at points 10/110/112. Further, in some embodiments, one or more of sensors 108/110/112 is a preheated zirconia probe, also known as lambda probe in the automotive and combustion fields. Such zirconia probes are reliable and respond quickly to the presence of oxygen ($O_2$) and/or water ($H_2O$). Table 2 illustrates the millivolt output of a typical zirconia sensor calculated from the Nernst equation for different preheating temperatures. The probes can also register and display in mV the presence of water, because a portion of water dissociates on the surface of zirconia membrane creating a defined oxygen potential: $H_2O=H_2+0.5\ O_2$, and $p(O_2)=\{K(T)\ p(H_2O)/p(H_2)\}^2$, where: $K(T)$ is a temperature-dependent reaction constant, and $p(O_2)$, $p(H_2O)$, and $p(H_2)$ are partial pressures of oxygen, water, and hydrogen, respectively. Thus, the voltage reading of a zirconia probe is a way to measure the level of impurity due to the presence of $O_2$. At a probe temperature of 600° C., voltage readings more negative than minus 185 mV (<−185 mV) may indicate a 3DP atmosphere having the most desirable conditions.

TABLE 2

Electromotive force output (in millivolts) as a function of oxygen content in inert gas for zirconia probe using air at 1 atm pressure as the reference electrode; calculated from Nernst equation:

| O2 vol. conc. | O2 partial press. in atm. | mV readings for ZrO2 sensor | | |
| --- | --- | --- | --- | --- |
| | | 25° C. | 300° C. | 600° C. |
| | | temp. in Kelvin: | | |
| | | 298 | 573 | 873 |
| 1 ppb | 1.E-09 | −123 | −236 | −360 |
| 10 ppb | 1.E-08 | −108 | −208 | −317 |
| 100 ppb | 1.E-07 | −93 | −180 | −274 |
| 1 ppm | 1.E-06 | −79 | −151 | −230 |
| 10 ppm | 1.E-05 | −64 | −123 | −187 |
| 100 ppm | 1.E-04 | −49 | −94 | −144 |
| 0.100% | 1.E-03 | −34 | −66 | −100 |
| 1.000% | 1.E-02 | −20 | −38 | −57 |

In alternative embodiments of the invention, the printing chamber 102 may instead be a laser weld overlay system having the same basic configuration as the printing chamber. In such embodiments, the laser printing head 130 is instead a laser welding head and the part to be formed 132 is instead a part to be welded. Accordingly, such a laser weld overlay system is not depicted separately, but can also be understood with reference to FIG. 1.

FIGS. 2A and 2B exemplify modes of operation according to the prior art (FIG. 2A) and the present invention (FIG. 2B). Operation according to FIG. 2B aims to increase the quality of 3DP products as well as increase the productivity of the entire 3DP operation. The line designated "acceptable oxygen concentration" represents the oxygen concentration at which the level of porosity and roughness in printed parts is still acceptable. The line designated "acceptable timepoint to start laser scanning" indicates the time required to purge the printing chamber to an acceptable oxygen concentration. FIG. 2A shows a conventional process using pure inert gas and a constant gas flowrate. As shown, there is a considerable delay between the start of chamber purging and the point at which the acceptable $O_2$ concentration is reached and laser scanning and printing can be initiated. FIG. 2B shows a process according to the invention using a high purity or purified inert gas and a gas flowrate dynamically controlled based on oxygen sensor readings. Thus, in response to an initially high $O_2$ concentration, the sensor-modulated gas system increases the flowrate of inert gas, reaching the acceptable $O_2$ concentration much faster than in FIG. 2A. Also, as the purge time passes, the ultimate, steady-state $O_2$ concentration in FIG. 2B drops to below that of FIG. 2A. This way, both productivity and product quality can be improved. The combination of atmosphere purity control and dynamic control of gas flow rate illustrated in FIG. 2B creates a "vacuum-like" environment for laser beam melting, where impurities and vapors released from feed powders are carried away from the work chamber without contaminating the surrounding powder, the chamber walls, or laser window. Also, liquid-phase consolidation of adjacent powder particles under a laser beam is easier and requires less energy, thus minimizing metal spatter because adsorbed and absorbed gases are removed more effectively and no new oxide films form that may obstruct powder fusing. The inert purge gas, introduced directly to the printing chamber and powder system (when required) is separate and independent from the laser head gas flowrate, which is set according to the specific laser optics requirements. Also, no gas flow rate modulation is necessary in the laser head and nozzles in laser 3DP methods that use a metallic powder spray rather than a powder bed.

The steady-state gas purity level illustrated in FIG. 2B, e.g. 99.9997% purity ("5.7N," with <0.02 ppm $H_2O$, <0.01 ppm $O_2$, and <0.1 ppm THC), and to a lesser degree in FIG. 2A, e.g. 99.999% purity ("5N," with <5 ppm $H_2O$, and <3 ppm $O_2$, <0.5 ppm THC) can promote refining of the feed material during laser remelting in the case of many alloys within the scope of the invention. A less pure inert gas, e.g. 99.998% purity ("4.8N," with <5 ppm $H_2O$, <4 ppm $O_2$, and <0.5 ppm THC) may, nevertheless, be used during the initial chamber purging step, and also during the subsequent printing operation, to reach an acceptable oxygen concentration level that doesn't purify the feed material but prevents its oxidation and degradation during the relatively fast scanning of the laser beam over the powder layer. Moreover, lower purities of inert gas can still substantially improve the quality of the printed parts when, in contrast to the conventional methods, the initial purge time is monitored using sensors 108/110/112.

Depending on the metal alloy or metallic composite selected, the inventive methods and systems may lead to one or more of the following improvements in laser 3DP processes and products: improved mechanical properties such as for example product density, surface roughness, geometric resolution, ductility, toughness, and/or corrosion resistance by reducing porosity, inclusions, and impurity solutes; improved geometric accuracy; minimized or eliminated need for post-processing heat treatments such as hot isostatic pressing (HIP); reduced spatter of material due to the use of a laser beam; enhanced lifetime of recycled powder; increased productivity by dynamic control of chamber purging, using finer feed powders which absorb laser light better, enabling chamber operation at elevated temperatures without the risk of powder oxidation (such as for example temperatures greater than 120° C., greater than 300° C., or greater than 500° C. and less than about 1000° C., less than 950° C., or less than 900° C.), or allowing for faster laser scanning speeds while still providing acceptable porosity and roughness levels; and reduced process and product costs by accepting less expensive gas atomized feed powders already containing residual gas porosity, as well as larger fractions of recycled feed powders, more effective utilization and/or recycling of inert gas, and reducing the need for and extent of post-3DP operations such as HIP. Further, because different feed powder batches may have different impurities and impurity levels, the ability of the systems and methods of the present invention to automatically adjust to maintain conditions within preset parameters results in reduction or elimination of operational and/or quality issues caused by batch-to-batch variations in composition and impurity levels.

Thus, specific methods and systems for controlling gas atmospheres in three-dimensional laser printing and weld overlay consolidation operations using metallic powders have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The invention claimed is:

1. A method for controlling gas atmospheres in three-dimensional laser printing using metallic powders, comprising the steps of:
    a. providing a 3D printer comprising a printing chamber, a gas supply system, and a feed powder system;
    b. providing an inert gas having a purity greater than or equal to 99.995% from the gas supply system to the printing chamber;
    c. providing one or more feed powders from the feed powder system to the printing chamber;
    d. providing one or more gas sensors located in one or more of the printing chamber, gas supply system, or feed powder systems; and
    e. printing an article,
wherein at least one of the one or more gas sensors is a gas composition sensor, and wherein one or more outputs from the at least one gas composition sensor effects an increase or decrease of an overall flowrate of the inert gas in order to maintain an atmosperic contaimant level inside the printing chamber below a desired value.

2. The method of claim 1, wherein the one or more outputs from the one or more gas sensors is selected from the oxygen concentration inside the printing chamber, the oxygen concentration inside the feed powder system, or both.

3. The method of claim 2, wherein an initially high oxygen concentration results in the one or more gas sensors modulating the gas supply system to increase the overall flowrate of the inert gas until a desired oxygen level is reached.

4. The method of claim 1, further comprising providing an in-line gas purifier within the gas supply system or between the gas supply system and the printing chamber.

5. The method of claim 1, wherein the inert gas purity is greater than or equal to 99.998%.

6. The method of claim 5, wherein the inert gas purity is greater than or equal to 99.999%.

7. The method of claim 1, wherein one or more of the gas sensors is a zirconia gas sensor having a millivolt reading more negative than −185 mV at a zirconia cell operation temperature of 600° C.

8. The method of claim 1, wherein the one or more feed powders are selected from alloy steels; superalloys; titanium, aluminum, nickel, copper, precious metals, cobalt, zirconium, niobium, molybdenum, tungsten, tantalum, hafnium, magnesium, and boron alloys; powder compositions resulting in composite parts containing metals, carbides, nitrides, aluminides, silicides, or borides; and combinations thereof.

9. The method of claim 1, where in the inert gas is selected from argon, helium and krypton, or combinations thereof.

10. The method of claim 1, wherein the printing chamber comprises a powder bed, and further comprising the step of pre-heating the powder bed to a temperature greater than about 400° C. prior to the printing step.

11. The method of claim 1, wherein at least one of the one or more gas sensors is connected to electromechanical gas flow controls inside the gas supply system.

* * * * *